United States Patent
Williams et al.

(10) Patent No.: US 6,530,621 B1
(45) Date of Patent: Mar. 11, 2003

(54) VEHICLE CONVERTIBLE TRACK SYSTEM

(75) Inventors: Bruce Preston Williams, Grosse Point Park, MI (US); Brock Winger, Dearborn, MI (US); Daniel George Young, Livonia, MI (US); John Olijnyk, Oakland, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/620,269

(22) Filed: Jul. 19, 2000

(51) Int. Cl.$^7$ .............................. B60J 7/06; B60R 9/00
(52) U.S. Cl. .................. 296/216.04; 296/219; 296/147; 224/326
(58) Field of Search ............... 296/216.07, 216.08, 296/219, 216.03–216.04, 216.02, 222, 3, 98, 100.16, 100.18, 147; 224/321, 326, 327; 135/119

(56) References Cited

U.S. PATENT DOCUMENTS

| | | | |
|---|---|---|---|
| 2,289,173 A | | 7/1942 | Best |
| 2,694,598 A | * | 11/1954 | Ulrich ........................ 296/219 |
| 3,260,929 A | | 7/1966 | Hedgepeth |
| 3,381,996 A | * | 5/1968 | Horan ......................... 296/219 |
| 3,637,252 A | * | 1/1972 | Metsker ...................... 296/205 |
| 4,046,273 A | | 9/1977 | Hughes |
| 4,440,434 A | * | 4/1984 | Celli ..................... 296/205 X |
| 4,449,657 A | * | 5/1984 | Moran ......................... 224/329 |
| 4,538,752 A | | 9/1985 | Welter |
| 4,563,034 A | * | 1/1986 | Lamb .......................... 296/98 |
| 4,923,245 A | * | 5/1990 | Kuwabara .......... 298/216.08 X |
| 5,454,612 A | * | 10/1995 | Christensen ................... 296/3 |
| 5,492,259 A | | 2/1996 | Tippets |
| 5,511,844 A | * | 4/1996 | Boardman ............. 296/107.07 |
| 5,540,476 A | * | 7/1996 | Cowsert ........... 296/107.07 X |
| 5,540,478 A | * | 7/1996 | Schuch ........................ 296/210 |
| 5,597,103 A | | 1/1997 | Nichols |
| 5,803,529 A | | 9/1998 | Perry-Bores et al. |
| 6,189,960 B1 | * | 2/2001 | Mumura et al. ........ 296/214 X |

FOREIGN PATENT DOCUMENTS

| | | | | |
|---|---|---|---|---|
| AT | 132091 | * | 2/1933 | ................. 296/219 |
| GB | 526159 | * | 11/1940 | ................. 296/205 |

* cited by examiner

*Primary Examiner*—Dennis H. Pedder
(74) *Attorney, Agent, or Firm*—David B. Kelley

(57) ABSTRACT

A convertible track system for an automotive vehicle includes a plurality of frame members each having a predetermined surface area, at least one of the frame members having a portion of exposed surface area adapted to receive a mounting mechanism thereon.

11 Claims, 2 Drawing Sheets

VEHICLE CONVERTIBLE TRACK SYSTEM

FIELD OF THE INVENTION

This invention relates to convertible systems for automotive vehicles, and more specifically, to an integrated convertible track mounting system.

BACKGROUND OF THE INVENTION

Sport utility vehicles are uniquely adapted for transporting a wide variety of cargo, particularly outdoor sporting equipment. External mounting systems for such cargo are often employed when extra internal space is needed. These mounting systems are often aftermarket systems that are typically mounted to the exterior of the vehicle. The ability of the sport utility vehicle to transport cargo, whether stored internally or mounted externally and while desirable to the consumer, conflicts with other desired features of an automotive vehicle.

One such feature is the convertible roof. Typical automotive vehicle convertible roof systems employ a collapsible frame structure in combination with a flexible roof material to provide an open-air environment when desired. This feature is in direct conflict with cargo mounting systems. For example, if it is desired to mount cargo to a convertible roof, it would not be possible to put the top down. In order to put the top down, the cargo would have to be removed. There are aftermarket frame structures which allow mounting without interfering with the vehicle roof top and are mounted to the existing frame structure of a vehicle, however, these systems add substantial weight to the vehicle, which is undesired.

It is therefore desired to combine the option for an open-air environment of a convertible vehicle with the advantageous mounting qualities of a sport utility vehicle while using the existing vehicle frame structure.

SUMMARY OF THE INVENTION

It is an object of the present invention to provide an integrated convertible track mounting system that overcomes the disadvantages of the prior art.

The present invention advantageously provides a convertible track system for an automotive vehicle that includes a plurality of frame members each having a predetermined surface area, at least one of the frame members having a portion of exposed surface area with a mounting mechanism disposed thereon.

According to a feature of the present invention, the plurality of frame members of the convertible track system are adapted to detachably receive a plurality of flexible panels therebetween, thereby advantageously providing the option of an open-air environment while still allowing for mounting cargo.

BRIEF DESCRIPTION OF THE DRAWINGS

These and other objects, features, and advantages of the present invention will become apparent from a reading of the following detailed description with reference to the accompanying drawings, in which.

DESCRIPTION OF THE PREFERRED EMBODIMENT(S)

Figure 1:
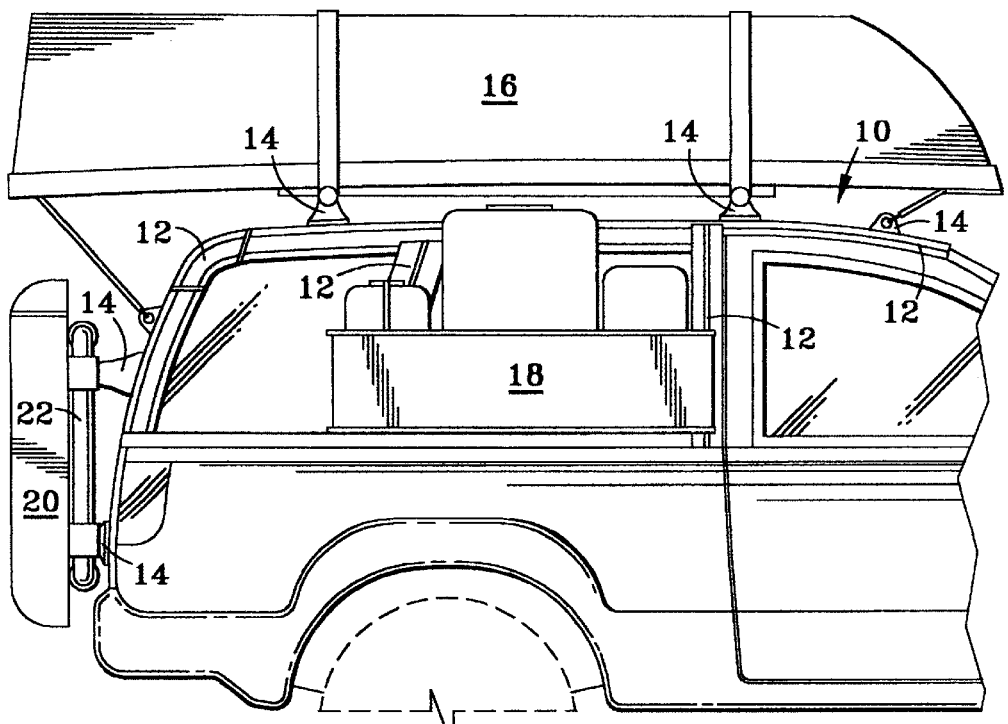
FIG. 1 is a partial side view of an automotive vehicle having an integrated convertible track mounting system according to the present invention.

Referring to FIG. 1, an automotive vehicle 10 is illustrated having an integrated convertible track mounting system 12. The convertible track mounting system 12 is comprised of a plurality of integrated horizontal and vertical frame members. The horizontal frame members include longitudinal frame members that form the lateral sides of the track system 12 and cross frame members which connect the longitudinal frame members of the track system 12. These horizontal frame members carry the roof panels 34 and 36. The vertical or side frame members form and carry the side window panels 38 as well as serve as B, C, and D pillars for the vehicle 10. Each frame member is adapted to receive a plurality of mounting mechanisms 14 to facilitate mounting cargo thereto.

Figure 2:
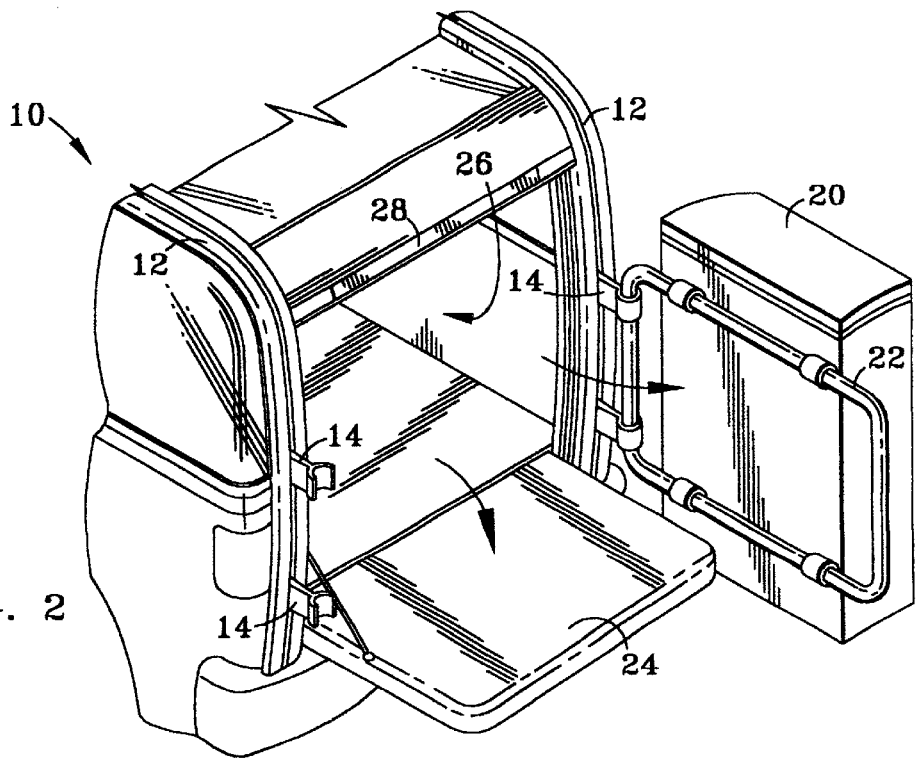
FIG. 2 is a partial perspective rear view of an integrated convertible track mounting system according to the present invention.

As shown in FIG. 2, the convertible track mounting system 12 advantageously does not interfere with other desired vehicle functions, such as a vehicle tailgate 24. The mounting mechanisms 14 pivotally support a swing frame 22 that has the luggage carrier 20 mounted thereto. The swing frame 22 is pivoted outward thereby allowing the tailgate 24 to be opened, thus allowing the vehicle operator access to the vehicle interior 26. The convertible track mounting system 12 is also advantageously adapted to receive a high-mount brake light 28.

Figure 3:
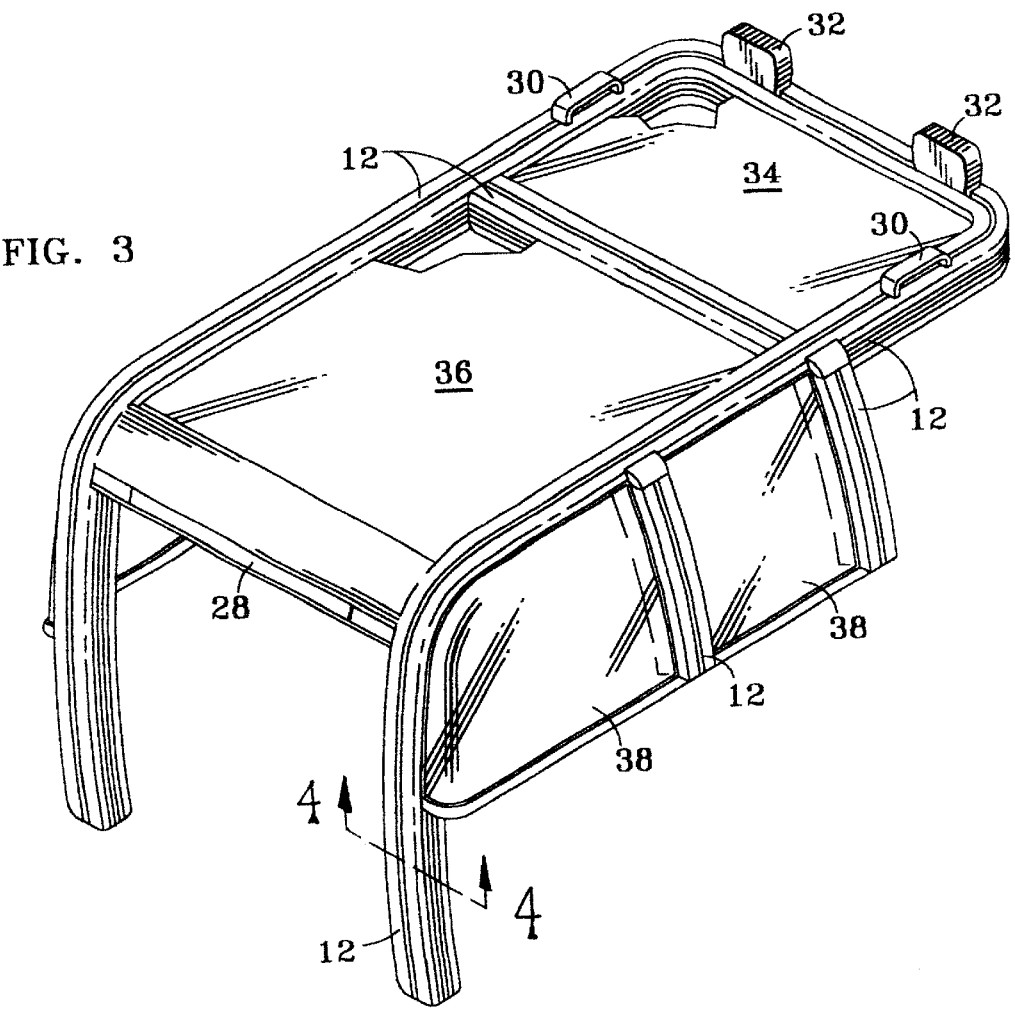
FIG. 3 is a perspective break-away view of an integrated convertible track mounting system according to the present invention.

As shown in FIG. 3, the convertible track mounting system 12 is also adapted to receive such components as hand assists 30 and high-mount floodlights 32. It is also envisioned that the mounting system 12 could carry positionable speakers (not shown) or any other consumer desired feature. The plurality of frame members of the mounting system 12 are adapted to detachably receive a plurality of flexible panels therebetween, thereby providing a convertible open-air environment independent of cargo mounted on the roof or rear members of the mounting system 12. A detachable driver roof panel 34, rear roof panel 36, and side panels 38 are envisioned. The panels 34, 36, and 38 are preferably flexible canvas-type panels as typically used with conventional convertible vehicle systems. These panels may have translucent polymeric inserts for added visibility if so desired. Further, the panels may be zip-out panels or retractably received by the frame members with possibly an automated or manual retraction system.

Figure 4:
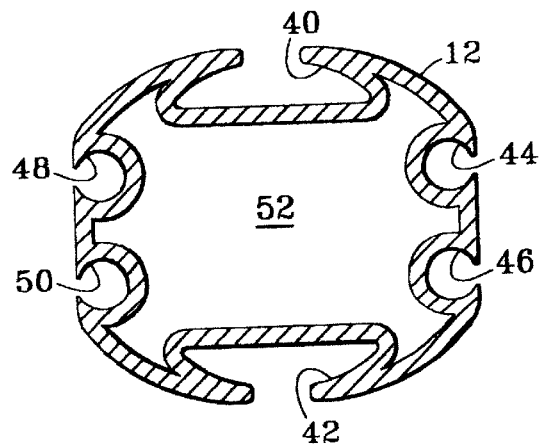
FIG. 4 is cross-sectional view taken along the line 4—4 of FIG. 3 of an integrated convertible track mounting system according to the present invention.

As shown in FIG. 4, the typical cross section of a frame member has an externally exposed portion of surface area 40, an internally exposed portion of surface area 42, and a plurality of exposed grooves 44, 46, 48, and 50 that are oriented to face corresponding grooves in adjacent frame members. When attached, the flexible panels 34, 36, and 38 fit into and are held stationary by the grooves 44, 46, 48, and 50 of corresponding frame members. The externally and internally exposed surface areas, 40 and 42 respectively, are semi-circular in cross-section and are preferably tracks for receiving the aforementioned mounting mechanisms 14. The externally exposed portion of surface area 40 is exposed to the outside of the vehicle 10 and the internally exposed portion of surface area 42 is exposed to the inside of the vehicle 10 such that gear, equipment, and the like can be easily attached to the frame members and can be readily accessible from outside or inside the vehicle 10. The frame structure 12 preferably has a hollow core 52.

While only one embodiment of the convertible track mounting system of the present invention has been described, others may be possible without departing from the scope of the following claims.

What is claimed is:

1. An integrated convertible track system for an automotive vehicle comprising:

a plurality of horizontal and vertical frame members including at least one side frame member between frontmost and rearmost pillars, each having a predetermined surface area, a predetermined portion of exposed recessed exterior surface area for receiving a mounting mechanism, and a predetermined portion of exposed recessed interior surface area for receiving a mounting mechanism.

2. The integrated convertible track assembly as defined in claim 1, wherein the predetermined portions of exposed recessed exterior and exposed recessed interior surface area have semi-circular cross-sections and wherein a portion of both the exposed recessed exterior and exposed recessed interior surface area is a track for receiving a mounting mechanism.

3. The integrated convertible track assembly as defined in claim 1, wherein a predetermined number of the frame members each have a portion of surface area facing an adjacent frame member, the surface area having grooves for receiving a convertible panel.

4. The integrated convertible track assembly as defined in claim 1, wherein the frame members have a hollow core.

5. The integrated convertible track assembly as defined in claim 3, wherein the convertible panel is received by the grooves of the frame member.

6. An integrated convertible track system for an automotive vehicle comprising:

a plurality of frame members including at least one side frame member between frontmost and rearmost pillars, each having a predetermined portion of surface area for receiving a convertible panel, a predetermined portion of exposed recessed exterior surface area for receiving a mounting mechanism, and a predetermined portion of exposed recessed interior surface area for receiving a mounting mechanism;

convertible panels detachably received by the predetermined portion of surface area of the frame members; and wherein when the convertible panels are received by the frame members, the predetermined portion of exposed recessed exterior and exposed recessed interior surface areas remain exposed.

7. The integrated convertible track assembly as defined in claim 6, wherein the predetermined portions of exposed recessed exterior and exposed recessed interior surface area have semi-circular cross-sections and wherein a portion of both the exposed recessed exterior and exposed recessed interior surface area is a track for receiving a mounting mechanism.

8. The integrated convertible track assembly as defined in claim 2, wherein the predetermined portion of surface area has grooves for receiving the convertible panel.

9. The integrated convertible track assembly as defined in claim 6, wherein the frame members have a hollow core.

10. The integrated convertible track assembly as defined in claim 1, wherein each frame member has a predetermined length and wherein the exposed recessed exterior and exposed recessed interior surface areas extend along the predetermined length.

11. The integrated convertible track assembly as defined in claim 6, wherein each frame member has a predetermined length and wherein the exposed recessed exterior and exposed recessed interior surface areas extend along the predetermined length.

* * * * *